(12) United States Patent
Odate et al.

(10) Patent No.: US 12,539,917 B2
(45) Date of Patent: *Feb. 3, 2026

(54) STEERING DEVICE HAVING AN AUXILIARY EQUIPMENT OPERATION CONSOLE HAVING AN ELECTRODE

(71) Applicant: HONDA MOTOR CO., LTD., Tokyo (JP)

(72) Inventors: Shotaro Odate, Saitama (JP); Takafumi Komori, Saitama (JP); Kotaro Nakamura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/729,514

(22) PCT Filed: Jan. 17, 2022

(86) PCT No.: PCT/JP2022/001393
§ 371 (c)(1),
(2) Date: Jul. 17, 2024

(87) PCT Pub. No.: WO2023/135805
PCT Pub. Date: Jul. 20, 2023

(65) Prior Publication Data
US 2025/0065942 A1   Feb. 27, 2025

(51) Int. Cl.
*B62D 1/08* (2006.01)
*B62D 1/04* (2006.01)
*B62D 15/02* (2006.01)

(52) U.S. Cl.
CPC .......... *B62D 15/029* (2013.01); *B62D 1/046* (2013.01); *B62D 1/08* (2013.01)

(58) Field of Classification Search
CPC ...... B62D 1/046; B62D 1/286; B62D 15/025; B62D 15/029
See application file for complete search history.

(56) References Cited

U.S. PATENT DOCUMENTS

2008/0238695 A1   10/2008   Yanai et al.
2017/0183025 A1   6/2017    Okazaki et al.
(Continued)

FOREIGN PATENT DOCUMENTS

CN   112249146 A   1/2021
JP   2002085360 A   3/2002
(Continued)

*Primary Examiner* — Minnah L Seoh
*Assistant Examiner* — Gregory T Prather
(74) *Attorney, Agent, or Firm* — CKC & Partners Co., LLC

(57) ABSTRACT

A steering device 1 accepts steering operations by a driver and comprises: an annular rim 20; a hub 23 located on the inner side of the rim 20; spokes 25L, 25R which extend radially from the hub 23 and which are connected to a rim inner circumference 21 of the rim 20; electrode devices 55L, 55R provided in the spokes 25L, 25R, respectively; and a steering control device 4 that detects a change in the electrostatic capacitance between the electrode devices 55L, 55R and a ground connection. The electrode device 55L comprises a first electrode 56L having flat parts 561L, 562L, 563L directed toward the rim 20 and the electrode device 55R comprises a first electrode 56R having flat parts 561R, 562R, 563R directed toward the rim inner circumference 21.

4 Claims, 5 Drawing Sheets

(56) References Cited

U.S. PATENT DOCUMENTS

| | | | |
|---|---|---|---|
| 2021/0371001 A1 | 12/2021 | Osako et al. | |
| 2023/0227094 A1* | 7/2023 | Odate | B62D 1/06 74/552 |
| 2024/0182104 A1* | 6/2024 | Yamazaki | B62D 1/06 |
| 2024/0328832 A1* | 10/2024 | Horie | B62D 1/04 |
| 2024/0361156 A1* | 10/2024 | Masaki | G01D 5/24 |
| 2025/0065941 A1* | 2/2025 | Odate | H03K 17/955 |

FOREIGN PATENT DOCUMENTS

| | | |
|---|---|---|
| JP | 2008237378 A | 10/2008 |
| WO | 2016013180 A1 | 1/2016 |
| WO | 2020195620 A1 | 10/2020 |

* cited by examiner

STEERING DEVICE HAVING AN AUXILIARY EQUIPMENT OPERATION CONSOLE HAVING AN ELECTRODE

TECHNICAL FIELD

The present invention relates to a steering device. More specifically, the present invention relates to a steering device that receives steering operation by a driver.

BACKGROUND ART

In recent years, in order to improve traffic safety, vehicles have been equipped with a driving support device that assists a driver in driving a vehicle, such as a lane keep function, a lane deviation suppression function, a lane change function, and a preceding vehicle following function. In the vehicle equipped with such a driving support device, in some cases, a sensor device as described in Patent Document 1 detects whether a driver is gripping a steering wheel and, when it is detected that the driver is not gripping the steering wheel, the driver is urged to grip the steering wheel or a driving support function being executed is cancelled.

The sensor device described in Patent Document 1 detects, based on a change in the capacitance of an electrode provided in a spoke part of the steering wheel, that a hand of the driver is in contact with or has approached the steering wheel.

CITATION LIST

Patent Document

Patent Document 1: PCT International Publication No. WO2020/195620

DISCLOSURE OF THE INVENTION

Problems to be Solved by the Invention

The sensor device described in Patent Document 1 includes a plate-like electrode that is provided in the spoke part such that a plane of the plate-like electrode faces the driver. Since a line of electric force induced around the electrode passes perpendicularly to the electrode, the sensor device described in Patent Document 1 sometimes cannot accurately detect the presence of a hand gripping an annular rim part provided radially outward of, and connected to, the spoke part.

In order to improve traffic safety, an object of the present invention is to provide a steering device that can accurately detect the presence of a hand of a driver gripping a rim part.

Means for Solving the Problems (1) A steering device according to the present invention is a steering device that receives steering operation by a driver, the steering device including: an annular rim part; a hub part provided inside the rim part; a spoke part extending in a radial direction from the hub part and connected to an inner circumferential portion of the rim part; an electrode provided in the spoke part; and a controller configured to detect a change in electric characteristics of the electrode. The electrode device includes a first electrode portion that has a plane facing the rim part.

(2) In this case, it is preferable that the spoke part includes an auxiliary equipment operation console that receives auxiliary equipment operation by the driver, and the first electrode portion is provided along a sidewall surface of the auxiliary equipment operation console.

(3) In this case, it is preferable that the first electrode portion is L-shaped when viewed from the driver and includes: a first flat portion provided along a first sidewall surface that belongs to the auxiliary equipment operation console and is located upward when viewed from the driver; and a second flat portion provided along a second sidewall surface that belongs to the auxiliary equipment operation console and is located outward in the radial direction.

(4) In this case, it is preferable that at least one of the first and second flat portions has, at an edge portion thereof located close to the driver, a bent portion that is L-shaped in a sectional view.

(5) In this case, it is preferable that the first electrode portion is C-shaped when viewed from the driver and includes: a first flat portion provided along a first sidewall surface that belongs to the auxiliary equipment operation console and is located upward when viewed from the driver; a second flat portion provided along a second sidewall surface that belongs to the auxiliary equipment operation console and is located outward in the radial direction; and a third flat portion provided along a third sidewall surface that belongs to the auxiliary equipment operation console and is located downward when viewed from the driver.

(6) In this case, it is preferable that at least any one of the first, second, and third flat portions has, at an edge portion thereof located close to the driver, a bent portion that is L-shaped in a sectional view.

(7) In this case, it is preferable that the electrode device further includes a second electrode portion provided adjacent to a rear surface side of the auxiliary equipment operation console and having a plane facing toward the driver.

Effects of the Invention (1) The steering device includes the annular rim part, the hub part provided inside the rim part, the spoke part extending in a radial direction from the hub part and connected to the inner circumferential portion of the rim part, the electrode provided in the spoke part, and the controller that detects a change in electric characteristics of the electrode. In the steering device according to the present invention, the electrode includes the first electrode portion that has the plane facing the rim part. Thus, according to the present invention, a line of electric force passing near the rim part can be induced by the first electrode portion facing the rim part from the spoke part. Therefore, it is possible to accurately detect a hand of the driver that is in contact with or approaches the rim part, thereby contributing to improvement of traffic safety.

(2) In the present invention, the first electrode portion is provided along the sidewall surface belonging to the auxiliary equipment operation console provided in the spoke part and facing the rim part. Accordingly, while achieving efficient installation of the auxiliary equipment operation console and the first electrode portion in the spoke part, it is possible to accurately detect a hand of the driver that is in contact with or approaches the rim part, thereby contributing to improvement of traffic safety.

(3) According to the present invention, in the spoke part, the first electrode portion is provided which is L-shaped when viewed from the driver and which includes: the first flat portion provided along the first sidewall surface that belongs to the auxiliary equipment operation console and is located upward when viewed from the driver; and the second flat portion provided along the second sidewall surface that belongs to the auxiliary equipment operation console and is located outward in the radial direction. Thus, in the present invention, many lines of electric force can be induced in a portion in the range of 60° to 90° that can be gripped by the right hand of the driver or a portion in the range of 270° to 300° that can be gripped by the left hand of the driver in the annular rim part. Therefore, it is possible to accurately detect the hands of the driver that are in contact with or approach the ranges of the rim part, thereby contributing to improvement of traffic safety.

(4) In the present invention, at least one of the first and second flat portions has, at an edge portion thereof located close to the driver, the bent portion that is L-shaped in a sectional view. Accordingly, not only a line of electric force extending from the spoke part toward the rim part but also a line of electric force extending from the spoke part toward the driver can be induced. Therefore, it is possible to also detect a hand of the driver that is in contact with or approaches the spoke part, thereby contributing to improvement of traffic safety.

(5) According to the present invention, in the spoke part, the first electrode portion is provided which is C-shaped when viewed from the driver and which includes: the first flat portion provided along the first sidewall surface that belongs to the auxiliary equipment operation console and is located upward when viewed from the driver; the second flat portion provided along the second sidewall surface that belongs to the auxiliary equipment operation console and is located outward in the radial direction; and the third flat portion provided along the third sidewall surface that belongs to the auxiliary equipment operation console and is located downward when viewed from the driver. Thus, in the present invention, many lines of electric force can be induced in a portion in the range of 60° to 120° that can be gripped by the right hand of the driver or a portion in the range of 240° to 300° that can be gripped by the left hand of the driver in the annular rim part. Therefore, it is possible to accurately detect the hands of the driver that are in contact with or approach the ranges of the rim part, thereby contributing to improvement of traffic safety.

(6) In the present invention, at least any one of the first to third flat portions has, at an edge portion thereof located close to the driver, the bent portion that is L-shaped in a sectional view. Accordingly, not only a line of electric force extending from the spoke part toward the rim part but also a line of electric force extending from the spoke part toward the driver can be induced. Therefore, it is possible to also detect a hand of the driver that is in contact with or approaches the spoke part, thereby contributing to improvement of traffic safety.

(7) In the present invention, the second electrode portion having the plane facing the driver is provided adjacent to the rear surface side of the auxiliary equipment operation console. Accordingly, many lines of electric force can be induced near the spoke part. Therefore, it is possible to also detect a hand of the driver that is in contact with or approaches the spoke part, thereby contributing to improvement of traffic safety.

PREFERRED MODE FOR CARRYING OUT THE INVENTION

First Embodiment

A steering device according to a first embodiment of the present invention will be described below with reference to the drawings.

Figure 1:
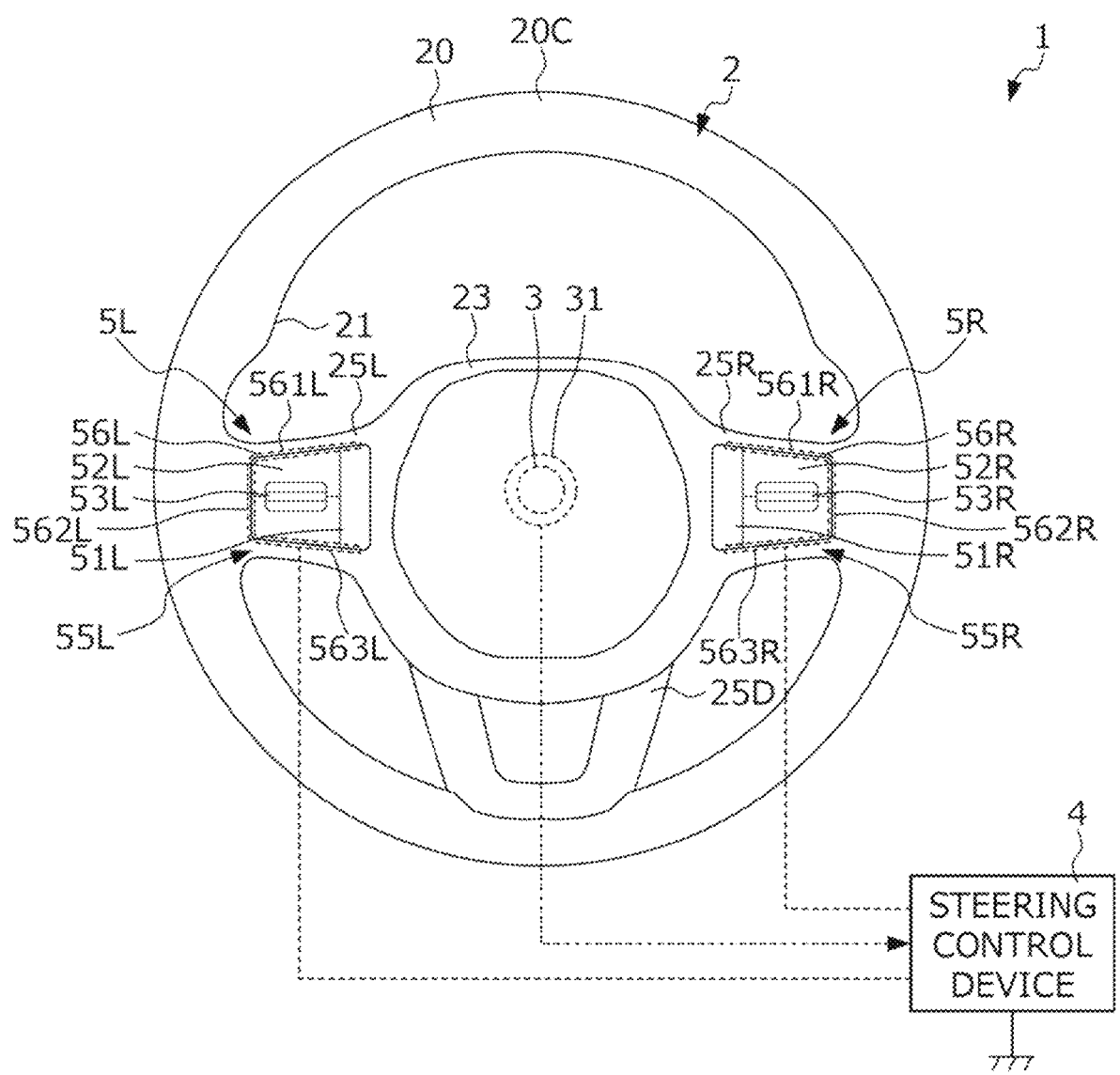
FIG. 1 is a diagram illustrating a configuration of a steering device according to a first embodiment of the present invention.

FIG. 1 is a diagram illustrating a configuration of a steering device 1 according to the present embodiment. The steering device 1 includes a steering wheel 2 that receives steering operation for a vehicle, auxiliary equipment operation on vehicle auxiliary equipment, and the like by a driver, a steering shaft 3 that pivotally supports the steering wheel 2, and a steering control device 4.

The steering wheel 2 includes a rim part 20 that is annular and can be gripped by the driver, a hub part 23 provided inside the rim part 20, and three spoke parts 25L, 25R, and 25D extending from the hub part 23 in the radial direction and connected to a rim-inner-circumferential portion 21 of the rim part 20.

The hub part 23 has a disk-like shape, is provided, for example, at the center of the rim part 20 as viewed from the driver, and constitutes the center of the steering wheel 2. The steering shaft 3 that has a shaft-like shape and pivotally supports the steering wheel 2 and transmits steering torque generated by the driver rotating the steering wheel 2 to a steering mechanism (not shown) is connected to the rear surface side of the hub part 23 as viewed from the driver. The steering shaft 3 is provided with a torque sensor 31 that detects the steering torque acting on the steering shaft 3 and outputs a signal corresponding to a detection value to the steering control device 4.

The rim part 20 and the hub part 23 are connected via the three spoke parts 25L, 25R, and 25D. The spoke part 25L on the left extends in the horizontal direction and connects a left side portion of the hub part 23 as viewed from the driver to a left side portion of the rim-inner-circumferential portion 21 as viewed from the driver. The spoke part 25R on the right extends in parallel to the left spoke part 25L and in the horizontal direction and connects a right side portion of the hub part 23 as viewed from the driver to a right side portion of the rim-inner-circumferential portion 21 as viewed from the driver. The spoke part 25D in a lower part extends orthogonally to the spoke parts 25L and 25R and in the vertical direction and connects a lower side portion of the hub part 23 as viewed from the driver to a lower side portion of the rim-inner-circumferential portion 21 as viewed from the driver.

In the following description, the positions of the rim part 20 having a substantially circular shape as viewed from the driver, the rim-inner-circumferential portion 21, the hub part 23, and the steering shaft 3, and the orientations of the spoke parts 25L, 25R, and 25D may be represented by a clockwise angle [°] centered on the steering shaft 3, with respect to an upper end 20C of the rim part 20 as viewed from the driver, as a reference. That is, the right spoke part 25R extends in a 90-degree direction and connects the hub part 23 to a 90-degree portion of the rim-inner-circumferential portion 21. The lower spoke part 25D extends in a 180-degree direction and connects the hub part 23 to a 180-degree portion of the rim-inner-circumferential portion 21. The left spoke part 25L extends in a 270-degree direction and connects the hub part 23 to a 270-degree portion of the rim-inner-circumferential portion 21.

The left spoke part 25L and the right spoke part 25R are respectively provided with a left auxiliary equipment operation console unit 5L and a right auxiliary equipment operation console unit 5R for receiving auxiliary equipment operation that the driver performs to operate vehicle auxiliary equipment (not shown; e.g., an audio device and a car navigation device). For example, these auxiliary equipment operation console units 5L and 5R are respectively rectangular when viewed from the driver. The driver can operate the vehicle auxiliary equipment by operating, with fingers, a plurality of switches 51L, 52L, 53L, 51R, 52R, and 53R provided to these auxiliary equipment operation console units 5L and 5R.

Figure 2:
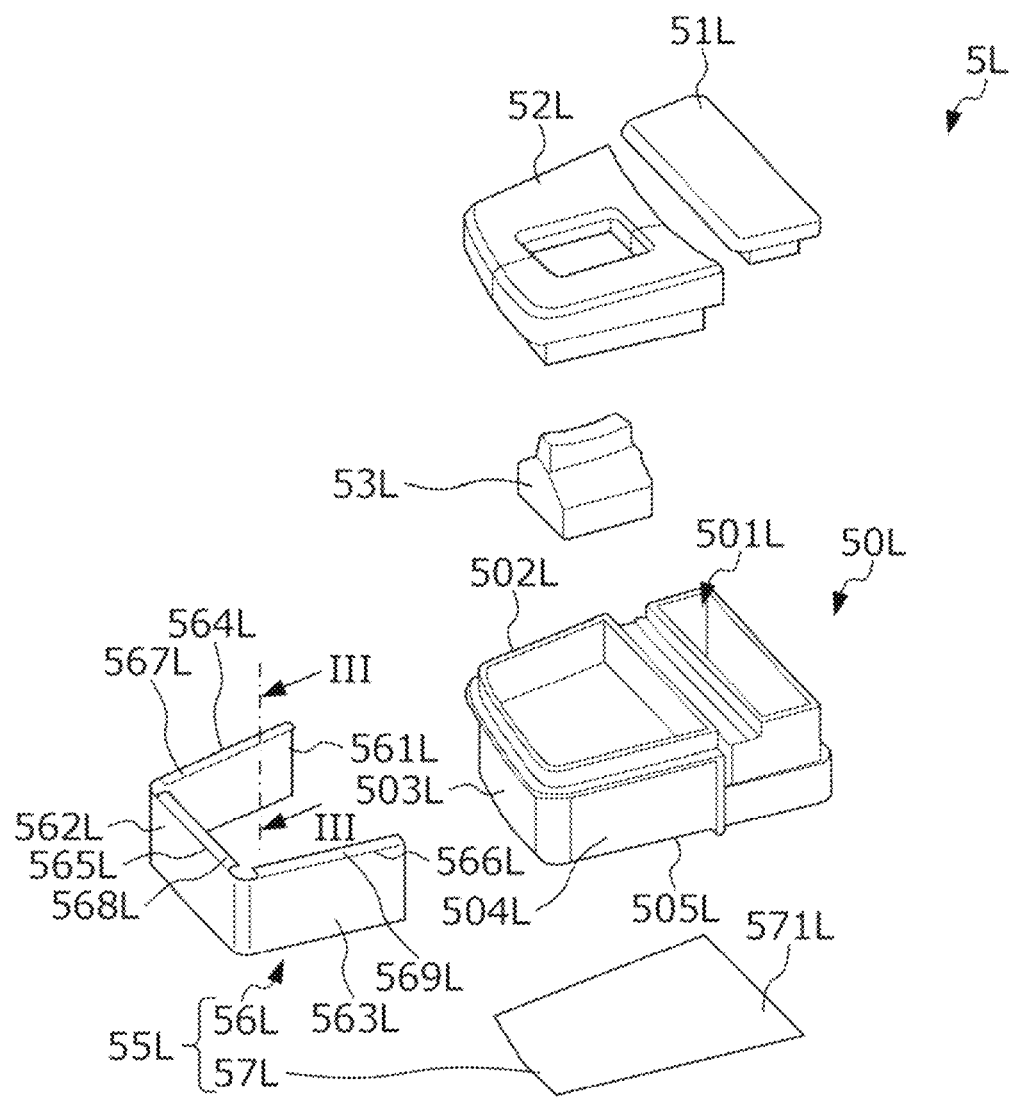
FIG. 2 is an exploded perspective view of a left auxiliary equipment operation console unit.

FIG. 2 is an exploded perspective view of the left auxiliary equipment operation console unit 5L. The left auxiliary equipment operation console unit 5L includes a plurality of lid-shaped switches 51L, 52L, and 53L that receive auxiliary equipment operation by the driver and a console main body 50L that supports these switches 51L, 52L, and 53L and an electrode device 55L.

The console main body 50L has a columnar shape and appears rectangular when viewed from the driver. The plurality of switches 51L, 52L, and 53L respectively have a lid-like shape and attached to an upper surface 501L of the console main body 50L facing the driver.

The electrode device 55L includes a first electrode portion 56L provided along sidewall surfaces 502L, 503L, and 504L of the console main body 50L and a second electrode portion 57L provided along a rear surface 505L of the console main body 50L as viewed from the driver.

The first electrode portion 56L is formed by bending a conductive plate material so as to extend along the sidewall surfaces 502L, 503L, and 504L of the console main body 50L and is C-shaped when viewed from the driver. More specifically, the first electrode portion 56L includes a first flat portion 561L provided along a first sidewall surface 502L that belongs to the console main body 50L and is located upward when viewed from the driver, a second flat portion 562L provided along a second sidewall surface 503L that belongs to the console main body 50L is located outward on the left side (i.e., the radially outer side of the rim part 20) when viewed from the driver, and a third flat portion 563L provided along a third sidewall surface 504L that belongs to the console main body 50L and is located downward when viewed from the driver.

The first electrode portion 56L is attached to the left spoke part 25L such that the first flat portion 561L faces the first sidewall surface 502L, the second flat portion 562L faces the second sidewall surface 503L, and the third flat portion 563L faces the third sidewall surface 504L. Accordingly, as illustrated in FIG. 1, the first electrode portion 56L is provided in the left spoke part 25L such that the first flat portion 561L faces a substantially 300-degree portion of the rim-inner-circumferential portion 21, the second flat portion 562L faces toward a substantially 270-degree portion of the rim-inner-circumferential portion 21, and the third flat portion 563L faces toward a substantially 240-dgree portion of the rim-inner-circumferential portion 21.

Figure 3:
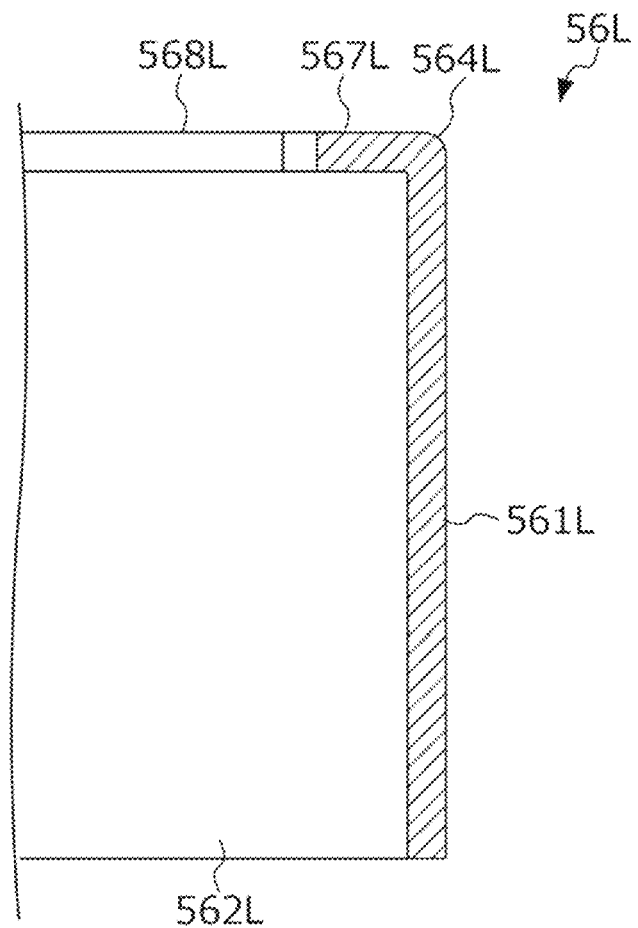
FIG. 3 is a sectional view taken along a line III-III in FIG. 2.

FIG. 3 is a sectional view taken along a median line III-III in FIG. 2 of the first flat portion 561L of the first electrode portion 56L. As illustrated in FIGS. 2 and 3, the flat portions 561L, 562L, and 563L of the first electrode portion 56L each have, at an edge portion thereof close to the driver, a bent portion 564L, 565L, 566L that is L-shaped in a sectional view. Accordingly, a first edge surface 567L, a second edge surface 568L, and a third edge surface 569L facing the driver are respectively formed at the edge portions belonging the flat portions 561L, 562L, and 563L of the first electrode portion 56L and close to the driver. It should be noted that although FIG. 2 illustrates a case in which the bent portions 564L, 565L and 566L are formed at all the flat portions 561L, 562L, and 563L of the first electrode portion 56L, the present invention is not limited to this case. That is, any one or any two of the three flat portions 561L, 562L, and 563L may be provided with the bent portion that is L-shaped in a sectional view.

Referring back to FIG. 2, the second electrode portion 57L is made of the same conductive plate material as the first electrode portion 56L and is provided adjacent to a side of the rear surface 505L of the console main body 50L as viewed from the driver. Accordingly, in a state in which the second electrode portion 57L is provided in the left spoke part 25L together with the console main body 50L, the second electrode portion 57L has a surface 571L facing in a direction orthogonal to the first electrode portion 56L, that is, facing the driver.

The specific configuration of the left auxiliary equipment operation console unit 5L has been described above with reference to FIGS. 2 and 3. Note that a specific configuration of the right auxiliary equipment operation console unit 5R is substantially the same as that of the left auxiliary equipment operation console 5L except for a disposition position and a n orientation thereof. Therefore, in the following description, differences from the left auxiliary equipment operation console unit 5L are mainly described, and illustration and detailed description of the same components as those of the left auxiliary equipment operation console unit 5L will be omitted as appropriate.

The right auxiliary equipment operation console unit 5R is constituted by combining a plurality of switches 51R, 52R, and 53R that receive auxiliary equipment operation by the driver and a console main body (not illustrated) that supports these switches 51R, 52R, and 53R and an electrode device 55R. The console main body of the right auxiliary equipment operation console unit 5R has a columnar shape and appears rectangular when viewed from the driver, like the console main body 50L of the left auxiliary equipment operation console unit 5L. The electrode device 55R of the right auxiliary equipment operation console unit 5R includes a first electrode portion 56R provided along a sidewall surface of the console main body and a second electrode portion (not illustrated) provided along a rear surface belonging to the console main body and located rearward when viewed from the driver.

Like the first electrode portion 56L of the left auxiliary equipment operation console unit 5L, the first electrode portion 56R includes a first flat portion 561R, a second flat portion 562R, and a third flat portion 563R. The first electrode portion 561R is provided in the right spoke part 25R such that the first flat portion 561R faces a substantially 60-degree portion of the rim-inner-circumferential portion 21, the second flat portion 562R faces a substantially 90-degree portion of the rim-inner-circumferential portion 21, and the third flat portion 563R faces a substantially 120-degree portion of the rim-inner-circumferential portion 21.

Figure 4:
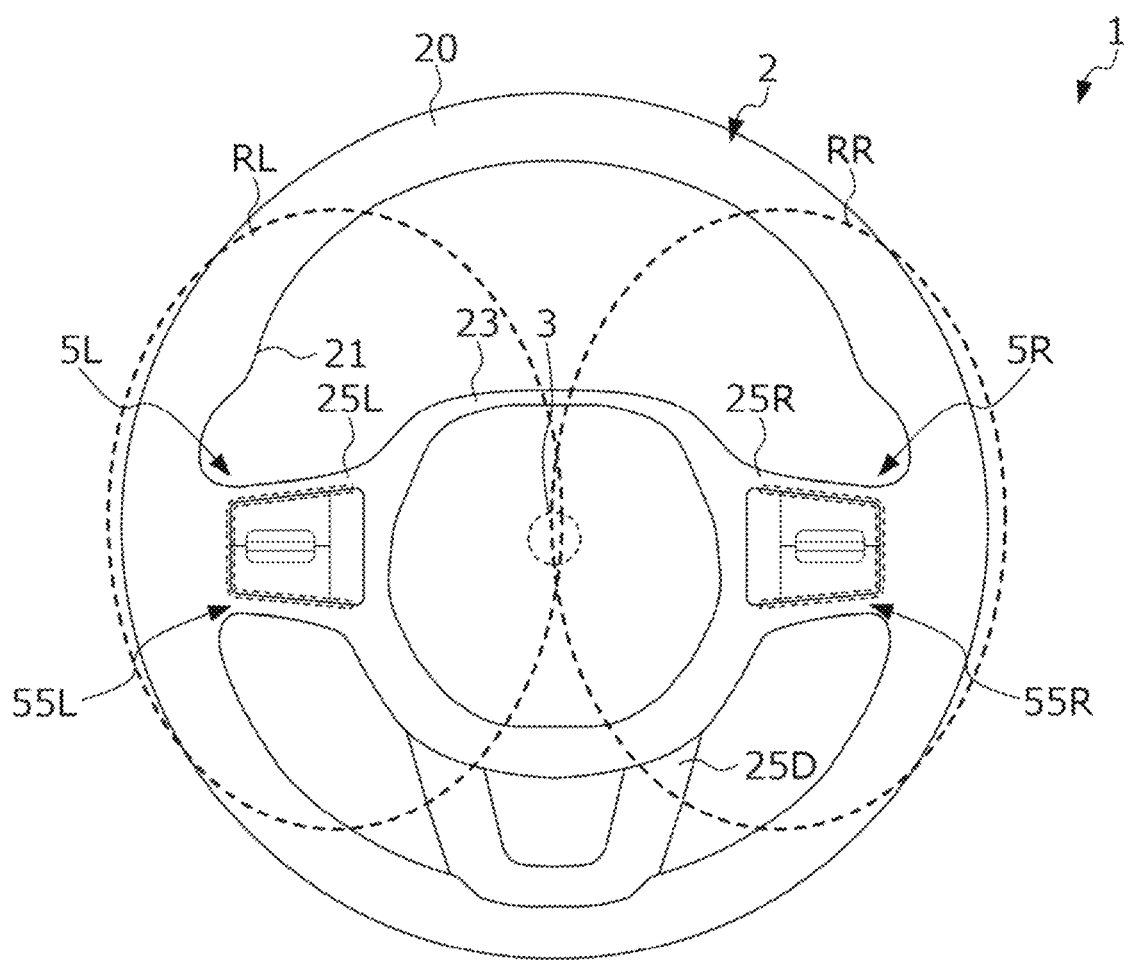
FIG. 4 is a diagram schematically illustrating a range of lines of electric force induced around electrode devices provided in spoke parts by applying a predetermined voltage to the electrode devices.

FIG. 4 is a diagram schematically illustrating ranges RL and RR of lines of electric force induced around the electrode devices 55L and 55R provided in the spoke parts 25L and 25R described above by applying a predetermined voltage to the electrode devices 55L and 55R.

As described above, the electrode devices 55L and 55R include the first electrode portions 56L and 56R including the flat portions 561L, 562L, 563L, 561R, 562R, and 563R facing the rim-inner-circumferential portion 21 and the second electrode portion having the plane facing toward the driver. Accordingly, the range RL of the line of electric force induced around the electrode device 55L by applying a voltage to the electrode device 55L includes a portion between 240° and 300° in the rim part 20. The range RR of the line of electric force induced around the electrode device 55R by applying a voltage to the electrode device 55R includes a portion between 60° and 120° in the rim part 20. Accordingly, if the driver grips the rim part 20 with one hand or both hands and, therefore, the hand of the driver is present in the range RL and/or the range RR in which the lines of electric force are induced, a change occurs in the electric characteristics of the electrode devices 55L and 55R, more specifically, in a capacitance formed between the electrode device 55L and the earth (the ground) and/or a capacitance formed between the electrode device 55R and the earth (the ground).

Referring back to FIG. 1, the steering control device 4 detects a change in a capacitance between the electrode device 55L and the ground and a change in a capacitance between the electrode device 55R and the ground and determines, based on the changes in the capacitances of the electrode devices 55L and 55R and steering torque detected by the torque sensor 31, whether the steering wheel 2 is gripped by the driver. More specifically, when the steering torque detected by the torque sensor 31 is equal to or greater than a predetermined torque threshold set for the vicinity of 0 or when a change in the capacitance of one of the electrode devices 55L and 55R from a predetermined reference value is equal to or greater than a predetermined capacitance threshold, the steering control device 4 determines that the driver is gripping the steering wheel 2. When the steering torque is less than the torque threshold and changes in the capacitances of both of the electrode devices 55L and 55R are less than the capacitance threshold, the steering control device 4 determines that the driver is not gripping the steering wheel 2.

Here, for example, when driving at a high-speed, it is almost unnecessary to perform steering operation. Therefore, the driver often grips the steering wheel 2 with both their hands on the 90-degree portion and the 270-degree portion of the rim part 20. However, in this case, steering torque is sometimes less than the torque threshold even though the driver is gripping the steering wheel 2. Accordingly, it cannot be appropriately determined, with only a detection signal of the torque sensor 31, whether the steering wheel 2 is gripped by the driver. In contrast, according to the present embodiment, the steering control device 4 determines whether the steering wheel 2 is gripped by the driver based on the detection signal from the torque sensor 31 and the changes in the capacitances of the two electrode devices 55L and 55R as described above, thereby making it possible to accurately determine whether the steering wheel 2 is gripped by the driver even in a situation in which the determination is hard to make based only on the signal from the torque sensor 31.

The steering device 1 according to the present embodiment exerts the following effects.

(1) The steering device 1 includes the annular rim part 20, the hub part 23 provided inside the rim part 20, the spoke parts 25L and 25R extending in the radial direction from the hub part 23 and connected to the rim-inner-circumferential portion 21 of the rim part 20, the electrode devices 55L and 55R provided in the spoke parts 25L and 25R, and the steering control device 4 that detects changes in capacitances (i.e., electric characteristics) of the electrode devices 55L and 55R. In the steering device 1 according to the present embodiment, the electrode devices 55L and 55R respectively include the first electrode portions 56L and 56R having the flat portions 561L, 562L, 563L, 561R, 562R, and 563R facing the rim-inner-circumferential portion 21 of the rim part 20 from the spoke parts 25L and 25R. Thus, according to the present embodiment, lines of electric force passing near the rim part 20 can be induced by the first electrode portions 56L and 56R facing the rim-inner-circumferential portion 21. Therefore, it is possible to accurately detect a hand of the driver that is in contact with or approaches the rim part 20, thereby contributing to improvement of traffic safety.

(2) In the steering device 1, the first electrode portions 56L and 56R are provided along the sidewall surfaces belong to the auxiliary equipment operation console units 5L and 5R provided in the spoke parts 25L and 25R and that face the rim-inner-circumferential portion 21 of the rim part 20. Accordingly, while achieving efficient installation of the auxiliary equipment operation console units 5L and 5R, which include the first electrode portions 56L and 56R, in the spoke parts 25L and 25R, it is possible to accurately detect hands of the driver that are in contact with or approach the rim part 20, thereby contributing to improvement of traffic safety.

(3) In the present embodiment, the second electrode portion having the plane facing the driver is provided adjacent to the rear surface side of the console main body of each of the auxiliary equipment operation console units 5L and 5R. Accordingly, many lines of electric force can be induced near the spoke parts 25L and 25R. Therefore, it is possible to also detect hands of the driver that are into contact with or approach the spoke parts 25L and 25R, thereby contributing to improvement of traffic safety.

(4) In the spoke parts 25L and 25R, the first electrode portions 56L and 56R are provided which are C-shaped when viewed from the driver and include: the first flat portions 561L and 561R provided along the first sidewall surfaces that belong to the console main bodies of the auxiliary equipment operation console units 5L and 5R and are located upward when viewed from the driver; the second flat portions 562L and 562R provided along the second sidewall surfaces that belong to the console main bodies and are located outward in the radial direction; and the third flat portions 563L and 563R provided along the third sidewall surfaces that belong to the console main bodies and are located downward when viewed from the driver. Thus, in the present embodiment, in the annular rim part 20, many lines of electric force can be induced near a portion in the range of 60° to 120° that can be gripped by the right hand of the driver or a portion in the range of 240° to 300° that can be gripped by the left hand of the driver. Therefore, it is possible to accurately detect the hands of the driver that are in contact with or approach these ranges of the rim part 20, thereby contributing to improvement of traffic safety.

(5) In the present embodiment, at least any of the first to third flat portions 561L to 563L and 561R to 563R of the first electrode portions 56L and 56R has, at an edge portion thereof located close to the driver, a bent portion that is L-shaped in a sectional view. Accordingly, not only lines of electric force extending from the spoke parts 25L and 25R toward the rim-inner-circumferential portion 21 of the rim part 20 but also lines of electric force extending from the spoke parts 25L and 25R toward the driver can be induced. Therefore, it is possible to also detect hands of the driver that are in contact with or approach the spoke parts 25L and 25R, thereby contributing to improvement of traffic safety.

Second Embodiment

Next, a steering device according to a second embodiment of the present invention is described with reference to the drawings. In the following description, the same components as those of the steering device according to the first embodiment are denoted by the same reference signs, and detailed description of the same components will be omitted.

Figure 5:
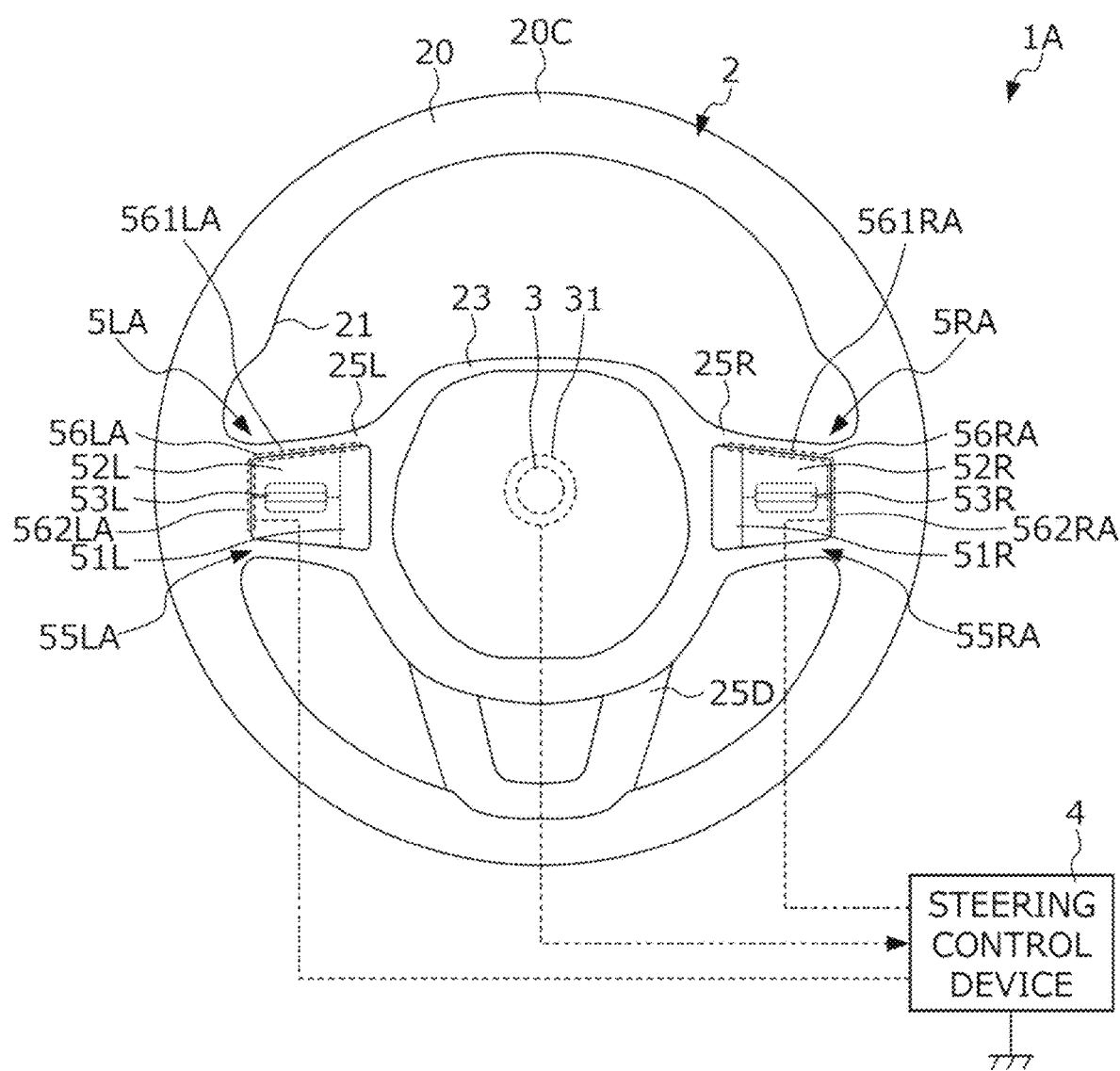
FIG. 5 is a diagram illustrating a configuration of a steering device according to a second embodiment of the present invention.

FIG. 5 is a diagram illustrating a configuration of a steering device 1A according to the present embodiment. The steering device 1A is different from the steering device 1 according to the first embodiment in configurations of electrode devices 55LA and 55RA of auxiliary equipment operation console units 5LA and 5RA provided in the spoke parts 25L and 25R. More specifically, the steering device 1A is different from the steering device 1 according to the first embodiment in configurations of first electrode portions 56LA and 56RA provided along sidewall surfaces of console main bodies of the auxiliary equipment operation console units 5LA and 5RA.

As illustrated in FIG. 5, the first electrode portions 56LA and 56RA provided in the spoke parts 25L and 25R are L-shaped when viewed from a driver. Specifically, the first electrode portions 56LA and 56RA include: first flat portions 561LA and 561RA provided along first sidewall surfaces that belong to the console main bodies provided in the spoke parts 25L and 25R and are located upward when viewed from the driver; and second flat portions 562LA and 562RA provided along second sidewall surfaces that belong to the console main bodies and are located outward in the radial direction.

Accordingly, as illustrated in FIG. 5, the first electrode portion 56LA is provided in the left spoke part 25L in a state in which the first flat portion 561LA faces a substantially 300-degree portion of the rim-inner-circumferential portion 21, and the second flat portion 562LA faces a substantially 270-degree portion of the rim-inner-circumferential portion 21. The first electrode portion 56RA is provided in the right spoke part 25R in a state in which the first flat portion 561RA faces a substantially 60-degree portion of the rim-inner-circumferential portion 21, and the second flat portion 562RA faces a substantially 90-degree portion of the rim-inner-circumferential portion 21.

Although not illustrated, as in the first embodiment, at least one of the first flat portion 561LA and the second flat portion 562LA of the first electrode portion 56LA preferably has, at an edge portion thereof close to the driver, a bent portion that is L-shaped in a sectional view. As in the first embodiment, at least one of the first flat portion 561RA and the second flat portion 562RA of the first electrode portion 56RA preferably has, at an edge portion thereof close to the driver, a bent portion that is L-shaped in a sectional view.

The steering device 1A according to the present embodiment exerts the following effects, in addition to (1) to (3) described above.

(6) According to the present embodiment, in the spoke parts 25L and 25R, the first electrode portions 56LA and 56RA are provided which are L-shaped when viewed from the driver and include: the first flat portion 561LA and 561RA provided along the first sidewall surfaces that belong to the console main bodies of the auxiliary equipment operation console units 5LA and 5RA and are located upward when viewed from the driver; and the second flat portions 562LA and 562RA provided along the second sidewall surfaces that belong to the console main bodies and are located outward in the radial direction. Thus, in the present embodiment, in the annular rim part 20, many lines of electric force can be induced near a portion in the range of 60° to 90° that can be gripped by the right hand of the driver or a portion in the range of 270° to 300° that can be gripped by the left hand of the driver. Therefore, it is possible to accurately detect the hands of the driver that are in contact with or approach these ranges of the rim part 20, thereby contributing to improvement of traffic safety.

(7) In the present embodiment, at least one of the first and second flat portions 561LA and 562LA of the first electrode portion 56LA and at least one of the first and second flat portions 561RA and 562RA of the first electrode portion 56RA have, at an edge portion thereof located close to the driver, the bent portion that is L-shaped in a sectional view. Accordingly, not only lines of electric force extending from the spoke parts 25L and 25R toward the rim-inner-circumferential portion 21 but also lines of electric force extending from the spoke parts 25L and 25R to the driver can be induced. Therefore, it is possible to also detect hands of the driver that are in contact with or approach the spoke parts 25L and 25R, thereby contributing to improvement of traffic safety.

Embodiments of the present invention have been explained above. However, the present invention is not limited to the embodiments. The specifics of the configurations may be changed as appropriate within the spirit of the present invention.

EXPLANATION OF REFERENCE NUMERALS 1, 1A steering device
2 steering wheel
20 rim part
21 rim-inner-circumferential portion (inner-circumferential portion)
23 hub part
25L left spoke part (spoke part)

25R right spoke part (spoke part)
5L, 5LA left auxiliary equipment operation console unit
50L console main body
501L upper surface
502L first sidewall surface (sidewall surface)
503L second sidewall surface (sidewall surface)
504L third sidewall surface (sidewall surface)
505L rear surface
51L, 52L, 53L switch
55L, 55LA electrode device
56L, 56LA first electrode portion (first electrode portion)
561L, 561LA first flat portion
564L first bent portion (bent portion)
562L, 562LA second flat portion
565L second bent portion (bent portion)
563L third flat portion
566L third bent portion (bent portion)
57L second electrode portion
571L surface (plane)
5R, 5RA right auxiliary equipment operation console unit
51R, 52R, 53R switch
55R, 55RA electrode device
56R, 56RA first electrode portion
561R, 561RA first flat portion
562R, 562RA second flat portion
563R third flat portion
3 steering shaft
31 torque sensor
4 steering control device (controller)

The invention claimed is:

1. A steering device that receives steering operation by a driver, the steering device comprising:
   an annular rim part;
   a hub part provided inside the rim part;
   a spoke part extending in a radial direction from the hub part and connected to an inner circumferential portion of the rim part;
   an auxiliary equipment operation console provided in the spoke part and receiving auxiliary equipment operation by the driver;
   an electrode provided in the spoke part; and
   a controller configured to detect a change in electric characteristics of the electrode, wherein
   the electrode includes: a first electrode portion provided along a sidewall surface of the auxiliary equipment operation console and having a plane facing the rim part; and a second electrode portion provided adjacent to a rear side of the auxiliary equipment operation console when viewed from the driver and having a plane facing the driver,
   the first electrode portion includes: a first flat portion provided along a first sidewall surface that belongs to the auxiliary equipment operation console and is located upward when viewed from the driver; and a second flat portion provided along a second sidewall surface that belongs to the auxiliary equipment operation console and is located outward in the radial direction, and
   the second flat portion has, at an edge portion on a front side of the auxiliary equipment operation console when viewed from the driver, a bent portion that is L-shaped in a sectional view.

2. The steering device according to claim 1, wherein a first bent portion and a second bent portion, both of which are L-shaped in a sectional view, are formed on the front side of the auxiliary equipment operation console when viewed from the driver of the first and second flat portions.

3. The steering device according to claim 1, wherein the first electrode portion is C-shaped when viewed from the driver and further includes a third flat portion provided along a third sidewall surface that belongs to the auxiliary equipment operation console and is located downward when viewed from the driver.

4. The steering device according to claim 3, wherein a third bent portion, which is L-shaped in a sectional view, is formed on the front side of the auxiliary equipment operation console when viewed from the driver of the third flat portion.

* * * * *